(12) United States Patent
Saito et al.

(10) Patent No.: US 7,312,289 B2
(45) Date of Patent: Dec. 25, 2007

(54) FLUORINE-CONTAINING ELASTOMER AND ITS COMPOSITION

(75) Inventors: Satoru Saito, Kitaibaraki (JP); Jun Kanega, Kitaibaraki (JP); Satoshi Horie, Fujisawa (JP); Masashi Kudo, Fujisawa (JP)

(73) Assignee: Unimatec Co., Ltd., Tokyo (JP)

( * ) Notice: Subject to any disclaimer, the term of this patent is extended or adjusted under 35 U.S.C. 154(b) by 632 days.

(21) Appl. No.: 10/674,009

(22) Filed: Sep. 29, 2003

(65) Prior Publication Data

US 2004/0181022 A1 Sep. 16, 2004

(30) Foreign Application Priority Data

| Mar. 3, 2003 | (JP) | 2003-055183 |
| Mar. 27, 2003 | (JP) | 2003-086943 |
| Apr. 7, 2003 | (JP) | 2003-102462 |

(51) Int. Cl.
*C08C 16/24* (2006.01)

(52) U.S. Cl. ..................... 526/247; 526/255

(58) Field of Classification Search ............... 526/247, 526/255
See application file for complete search history.

(56) References Cited

U.S. PATENT DOCUMENTS 4,035,565 A 7/1977 Apotheker et al.
5,969,066 A * 10/1999 Enokida et al. ............. 526/247
6,734,254 B1 * 5/2004 Worm et al. ................ 525/199

FOREIGN PATENT DOCUMENTS

| JP | 58-4728 | 1/1978 |
| JP | 5-13961 | 10/1986 |

* cited by examiner

*Primary Examiner*—Yvonne Eyler
*Assistant Examiner*—Sudhakar Katakam
(74) *Attorney, Agent, or Firm*—Butzel Long

(57) ABSTRACT

A fluorine-containing elastomer having a copolymer composition, which comprises 50-85% by mole of (a) vinylidene fluoride, 0-25% by mole of (b) tetrafluoroethylene, 7-20% by mole of (c) perfluoro(methyl vinyl ether), 3-15% by mole of (d) $CF_2=CFO[CF_2CF(CF_3)O]nCF_3$ and 0.1-2% by mole of (e) RfX, where Rf is an unsaturated fluorohydrocarbon group having 2-8 carbon atoms and X is a bromine or iodine atom, can give curing products with distinguished low-temperature characteristics and solvent resistance without deteriorating the distinguished moldability and compression set characteristics proper to the fluorine-containing elastomer, and a fluorine-containing elastomer composition, which comprises 100 parts by weight of the present fluorine-containing elastomer, 0.1-10 parts by weight of an organic peroxide, 0.1-10 parts by weight of a polyfunctional unsaturated compound and not less than 2 parts by weight of an acid acceptor can give curing products with distinguished low-temperature characteristics and fuel oil resistance.

28 Claims, No Drawings

US 7,312,289 B2

FLUORINE-CONTAINING ELASTOMER AND ITS COMPOSITION

BACKGROUND OF THE INVENTION

1) Field of the Invention

The present invention relates to a fluorine-containing elastomer and its composition, and more particularly a fluorine-containing elastomer capable of giving curing products with distinguished moldability, low-temperature characteristics and solvent resistance, and a composition containing the same.

2) Related Art

Fluorine-containing elastomers (fluoroelastomers) based on the main structural unit of vinylidene fluoride-tetrafluoroethylene-perfluoro(methyl vinyl ether) have not only distinguished heat resistance and solvent resistance proper to the fluoroelastomer, but also have a distinguished low-temperature characteristic, and thus have been so far used in various industries including the automobile industries. However, such fluoroelastomers are now more often confronted with new technical problems imposed by the recent technical progress, particularly strict requirements for the low-temperature characteristics and resistance to alcoholic solvents such as methanol, etc., or further strict requirements for the heat resistance, solvent resistance and low-temperature resistance due to the recent emission gas control, etc.

To solve these problems of the fluorine-containing elastomers, it has been proposed to copolymerize a monomer having a plurality of ether bonds in the side chains in place of perfluoro(methyl vinyl ether) (JP-B-5-13961). In this case, to obtain copolymers in an elastomer state, a higher proportion of the monomer must be used in the copolymerization. In the case of a lower proportion the resulting copolymers, a semi-resinous state will be obtained, deteriorating the low-temperature characteristics. Actually, a recommendable proportion of such a monomer for use in the copolymerization is 12-50% by mole, and it is disclosed in Examples of the JP-B-5-13961 that the composition of the monomer in the copolymer is 25-32% by mole. The fluoroelastomers containing such a higher proportion of the monomer have not only a poor mechanical strength, but also such problems of poor moldability, e.g. foaming in the stage of molding.

A complete fuel oil resistance is required for sealing materials for automobile fuel so that commercially available fluorine-containing elastomers have been used for such sealing. As an automobile fuel, oxygen-containing fuels such as ether, alcohol, etc., in addition to the commonly used gasoline, are now gradually used from the viewpoint of combustion efficiency, etc. Fluorine-containing elastomers with an increased fluorine content can meet the oxygen-containing fuel, but an increased fluorine content deteriorates the low-temperature characteristics, resulting in a fear of fuel leakage when used in cold region in winter. A reduced fluorine content, on the other hand, can improve the low-temperature characteristics, but deteriorates the resistance to the oxygen-containing fuel. That is, it is quite difficult to satisfy these two problems at the same time.

SUMMARY OF THE INVENTION

An object of the present invention is to provide a fluorine-containing elastomer capable of giving curing products with distinguished low-temperature characteristics and solvent resistance without deteriorating the moldability and compression set characteristics proper to the fluorine-containing elastomers, and also a composition containing the same, which can give curing products with distinguished low-temperature characteristics, fuel oil resistance, etc.

The object of the present invention can be attained by a fluorine-containing elastomer having a copolymer composition, which comprises 50-85% by mole of (a) vinylidene fluoride, 0-25% by mole of (b) tetrafluoroethylene, 7-20% by mole of (c) perfluoro(methyl vinyl ether), 3-15% by mole of (d) $CF_2=CFO[CF_2CF(CF_3)O]nCF_3$, where n is an integer of 2-6, and 0.1-2% by mole of (e) RfX, where Rf is an unsaturated fluorohydrocarbon group having 2-8 carbon atoms, which may contain at least one ether group, and X is a bromine or iodine atom. The fluorine-containing elastomer can be prepared by copolymerization of the aforementioned monomer components preferably in the presence of bromo- and/or iodo compound represented by the general formula $R(Br)n(I)m$, where R is a saturated fluorohydrocarbon group or a saturated chlorofluoro hydrocarbon group, each having 2-6 carbon atoms, n and m each are 0, 1 or 2 and m+n is 2.

A fluorine-containing elastomer composition, which comprises 100 parts by weight of said fluorine-containing elastomer, 0.1-10 parts by weight of an organic peroxide, 0.1-10 parts by weight of a polyfunctional unsaturated compound, and at least 2 parts by weight of an acid acceptor can give a curing product with distinguished low-temperature characteristics and fuel oil resistance. That is, the curing products can be used as suitable sealing materials for automobile fuel.

DETAILED DESCRIPTION OF THE INVENTION

The copolymer composition of the present fluorine-containing elastomer comprises 50-85% by mole, preferably 60-85% by mole, of (a) vinylidene fluoride, 0-25% by mole, preferably 0-20% by mole, of (b) tetrafluoroethylene, 7-20% by mole, preferably 7-15% by mole, of (c) perfluoro(methyl vinyl ether), 3-15% by mole, preferably 3-10% by mole, of (d) perfluorovinyl ether represented by said general formula and 0.1-2% by mole, preferably 0.3-1.5% by mole, of (e) an unsaturated bromo or iodo compound represented by said general formula. Proportions of these monomer components have been selected as ranges capable of giving curing products with desired low-temperature characteristics and solvent resistance.

Vinylidene fluoride as component (a) is copolymerized with said components (b) to (e) on the following grounds.

Copolymerization with tetrafluoroethylene as component (b) can considerably improve the solvent resistance. Too high a proportion of component (b) will deteriorate the low-temperature characteristics, and thus the proportion must be not more than 25% by mole, preferably not more than 20% by mole. Furthermore, the copolymerization with component (b) can considerably improve a resistance to a fuel mixture with an oxygen-containing compound such as methanol-gasoline fuel mixture, ethanol-gasoline fuel mixture, etc., alcoholic fuels such as methanol, ethanol, etc. and ether fuels such as dimethyl ether, etc.

Perfluoro(methyl vinyl ether) as component (c) is an essential component for giving a flexibility to the resulting copolymers and also for improving the low-temperature characteristics, particularly $TR_{70}$ value in the TR test.

For perfluorovinyl ether as component (d), a single species or at least two species having different n values as a mixture of the compounds represented by said chemical formula can be used. A similar perfluorovinyl ether with such a chemical formula $CF_2=CFO[CF_2CF(CF_3)O]m-CF_2CF_2CF_3$ is well known (JP-B-5-13961), but results of studies made by the present inventors have revealed, as shown in the results of Comparative Example 5 which follows, that copolymerization of this monomers can give substantial low-temperature characteristics, but results in decrease in the molecular weight, lowering of moldability due to foaming in the stage of molding, decreasing in mechanical strength, etc. However, copolymerization of this monomer is recommended in such a range as not to deteriorate the desired properties, for example, in a proportion of not more than 1% by mole.

The present perfluorovinyl ether represented by said chemical formula as component (d) can be prepared by reaction of $CF_3OCF(CF_3)COF$ with hexafluoropropene oxide in the presence of a cesium fluoride catalyst, a diglyme solvent, etc., followed by reaction with anhydrous potassium carbonate and thermal decomposition reaction. The reaction product is a mixture of n=2-6, but perfluorovinyl ethers with desired n values can be isolated from one another by fractional distillation and used alone, or the reaction product as such, i.e. as a mixture can be also used without the isolation.

The bromo or iodo compound as component (e) has an unsaturated fluorohydrocarbon group having 2-8 carbon atoms as an Rf group, and includes, for example, $CF_2=CFOCF_2CF_2Br$, $CF_2=CFOCF_2CF(CF_3)OCF_2-CF_2Br$, $CF_2=CFBr$, $CF_2=CHBr$, $CF_2=CFI$, $CF_2=CHI$, etc. The bromo or iodo compound with a unsaturated fluorohydrocarbon group having at least one ether bond can be also used (see JP-B-54-1585). Preferably, $CF_2=CFOCF_2-CF_2Br$, $CF_2=CFI$ and $CF_2=CHI$ can be used.

To adjust the molecular weight of the present fluorine-containing elastomeric copolymer or the moldability, particularly to prevent a foaming in the stage of curing, it is very effective to carry out the copolymerization reaction in the presence of bromo and/or iodo compound represented by the general formula R(Br)n(I)m (see JP-B-54-1585). Such compound includes, for example, $ICF_2CF_2CF_2CF_2I$, $ICF_2CF_2CF_2CF_2Br$, $ICF_2CF_2Br$, etc., and particularly $ICF_2CF_2CF_2CF_2I$ is preferable from the viewpoint of curing characteristics, etc. Other examples are disclosed in JP-B-58-4728, etc.

These compounds act as a chain transfer agent to adjust the molecular weight of the resulting copolymers. As a further result of the chain transfer reaction, copolymers with bromine and/or iodine atom as bonded to the molecule ends can be obtained. The bromine and/or iodine atom-bonded ends of the molecules act as curing sites in the stage of curing molding. When these compounds are used in a much higher proportion in the polymerization step, the mechanical strength of the ultimate molding products will be lowered. Thus, it is recommended from the viewpoint of mechanical properties of the molding products to use not more than about 1% by weight, preferably about 0.5- about 0.01% by weight, of the bromo and/or iodo compound on the basis of weight of total monomers.

To improve the compression set characteristics of curing molding products, perfluorodivinyl ether as given by the following chemical formula can be copolymerized at the same time. It is recommended from the mechanical properties of the molding products to use not more than about 1% by weight, preferably about 0.5- about 0.1% by weight, of the perfluorodivinyl ether on the basis of weight of total monomers:

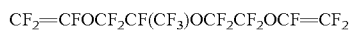

Other monomers, for example, such fluoring-containing monomers as trifluoroethylene, hexafluoropropene, chlorotrifluoroethylene, etc. can be further copolymerized within such a range as not to deteriorate the desired properties of the present fluorine-containing elastomer.

The present fluorine-containing elastomer can be prepared by an aqueous emulsion polymerization process or an aqueous suspension polymerization process. In the aqueous emulsion polymerization process, either a water-soluble peroxide alone or a combination thereof with a water-soluble reducing compound, i.e. a redox system, can be used as a reaction initiator. The water-soluble peroxide includes, for example, ammonium persulfate, potassium persulfate, sodium persulfate, etc. The water-soluble reducing compound includes, for example, sodium sulfite, sodium hydrogen sulfite, etc. A pH-adjusting agent (buffer agent) such as sodium monohydrogen phosphate, sodium dihydrogen phosphate, potassium monohydrogen phosphate, potassium dihydrogen phosphate, etc. can be used as a stabilizing agent for the aqueous emulsion at the same time.

As an emulsifying agent for use in the emulsion polymerization process, fluorocarboxylates can be usually used (see JP-B-5-13961), preferably fluorocarboxylates represented by the following chemical formula can be used:

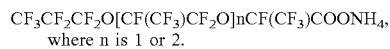
where n is 1 or 2.

The emulsifying agent can be used as an aqueous solution containing about 1- about 30% by weight, preferably about 5- about 20% by weight, thereof. Below about 1% by weight, the monomers and the resulting copolymers cannot be uniformly dispersed in the aqueous medium, whereas above about 30% by weight the process will become economically disadvantageous.

Copolymerization reaction is carried out at about 20°- about 80° C., preferably about 25°- about 60° C. Above about 80° C., such problems as foaming, etc. appear in the stage of molding, and the compression set characteristics of the curing molding products will be deteriorated. Polymerization pressure is usually not more than about 5 MPa.

The fluorine-containing elastomer thus obtained has a glass transition temperature Tg of −30° to −45° C. The molecular weight of the resulting copolymers is not particularly limited, but it is desirable that the number average molecular weight Mn (by GPC method, using tetrahydrofuran as a solvent) is about 10,000- about 1,000,000, preferably 50,000- about 300,000, It is also desirable that the solution viscosity η sp/c (in 1 wt. % methyl ethyl ketone solution at 35° C.) as an index of the molecular weight is about 0.1- about 2 dl/g, preferably about 0.2- about 1 dl/g. Sometimes, the resulting copolymers are sparingly soluble or insoluble in 1 wt. % methyl ethyl ketone solution, depending on the composition or molecular weight of the resulting copolymers. In that case, hexafluorobenzene is used as a solvent to determine the solution viscosity η sp/c in 1 wt. % hexafluorobenzene solution (35° C.), where it is desirable that the value of the solution viscosity η sp/c is about 0.1- about 7 dl/g, preferably 0.3-5 dl/g.

The fluorine-containing elastomer with such characteristics can be molded by the so far well known curing processes, such as peroxide curing process, polyamine curing process, polyol curing process or irradiation process with radiation beams, electron beams, etc., among which the peroxide curing process using an organic peroxide is particularly preferable, because it can give curing products with distinguished mechanical strength and also with distinguished chemical resistance, wear resistance, solvent resistance, etc. due to formation of carbon-carbon bonds in a stable cross-linking point structure.

The organic peroxide for use in the peroxide curing process includes, for example, 2,5-dimethyl-2,5-bis(t-butylperoxy)hexane, 2,5-dimethyl-2,5-bis(t-butylperoxy)hexine-3, benzoyl peroxide, bis(2,4-dichlorobenzoyl) peroxide, dicumyl peroxide, di-t-butyl-peroxide, t-butyl cumyl peroxide, t-butylperoxybenzene, 1,1-bis(t-butylperoxy)-3,5,5-trimethylcyclohexane, 2,5-dimethylhexane-2, 5-dihydroxyperoxide, α, α'-bis(t-butyl-peroxy)-p-diisopropylbenzene, 2,5-dimethyl-2,5-di(benzoylperoxy)hexane, t-butylperoxyisopropyl carbonate, etc.

In the peroxide curing process using the organic peroxide, it is preferable to use a polyfunctional unsaturated compound as a co-curing agent. The polyfunctional unsaturated compound includes, for example, tri(meth)allyl isocyanurate, tri(meth)allyl cyanulate, triallyl trimellitate, N,N'-m-phenylene bismaleimide, diallyl phthalate, tris(diallylamine)-s-triazine, triallyl phosphite, 1,2-polybutadiene, ethyleneglycol diacrylate, diethylene glycol diacrylate, etc. The co-curing agent, when used, can give curing products with much more distinguished curing characteristics, mechanical strength, compression set characteristics, etc.

Furthermore, hydrotalcite compounds, or oxides or hydroxides of divalent metal, for example, oxides or hydroxides of calcium, magnesium, lead, zinc or the like can be used as an acid acceptor.

Proportions of the aforementioned components for use in the peroxide curing system are 100 parts by weight of the present fluorine-containing elastomer, about 0.1- about 10 parts by weight, preferably about 0.5- about 5 parts by weight, of an organic peroxide, and, if desired, about 0.1- about 10 parts by weight, preferably about 0.5- about 5 parts by weight, of a co-curing agent and at least about 2 parts by weight, preferably about 3- about 20 parts by weight, of an acid acceptor. Below about 2 parts by weight of the acid acceptor, the metal corrosion resistance will be deteriorated.

In the curing, so far well known fillers, reinforcing agents, plasticizers, lubricants, processing aids, pigments, etc. can be appropriately added to the peroxide curing system besides the aforementioned components. When carbon black is used as a filler or a reinforcing agent, about 10- about 50 parts by weight of carbon black can be usually used on the basis of 100 parts by weight of the present fluorine-containing elastomer.

Still furthermore, addition of fine bituminous powder can improve the compression set characteristics and the heat resistance to prolong the life of sealing material, etc. Addition of a flat filler can improve the prevention of fuel oil leakage, thereby much more suppressing evaporative dissipation of automobile fuel, etc. as a sealing target.

As the fine bituminous powder, fine powder having average particle sizes of not more than about 10 μm, usually particle sizes of about 1- about 10 μm, preferably about 3- about 8 μm, obtained by pulverizing bituminous materials such as coal, etc. can be used. Above about 10 μm, the strength at break and elongation at break of the resulting rubber will be lowered, making the rubber strength-wise unpractical. Actually, commercially available products such as Mineral Black 325BA, etc. made by Keystone Filler & Mfg Co., can be used as such. The fine bituminous powder can be used in a proportion of not more than about 40 parts by weight, preferably about 5- about 30 parts by weight, on the basis of 100 parts by weight of the present fluorine-containing elastomer. Above about 40 parts by weight, the viscosity of the composition will be too high, causing troubles in the stage of kneading or molding.

The flat filler for use in the present invention is at least one member selected from, for example, clay, mica, graphite, molybdenum disulfide, etc., and has an average particle size of about 0.5- about 50 μm, preferably about 5- about 30 μm, and an aspect ratio of at least 3, preferably 5-30. When the average particle size is less than about 0.5 μm or the aspect ratio is less than 3, the prevention of fuel leakage will be no more improved, whereas when the average particle size is more than 50 μm, the strength at break and the elongation at break of the resulting rubber will be lowered, making the rubber strength-wise unpractical. The flat filler can be used in a proportion of not more than about 40 parts by weight, preferably about 5- about 30 parts by weight, on the basis of 100 parts by weight of the present fluorine-containing elastomer. Above 40 parts by weight, the viscosity of the composition will be increased and kneading cannot be carried out. Furthermore, the cured sealing materials will be so hard that the sealability will be deteriorated.

The aforementioned components are kneaded together by an ordinary mixing process, for example, roll mixing, kneader mixing, Bumbury mixing, solution mixing, etc., and the kneaded mixture is moled by compression molding usually at about 100°- about 250° C. for about 1- about 60 minutes, and preferably further subjected to oven curing (secondary curing) at about 150°- about 250° C. for not more than about 30 hours.

After curing with the organic peroxide, the resulting fluorine-containing elastomer can give a curing product having low-temperature characteristics as shown below:

$$-43° C. \leq TR_{10} < -30° C. < TR_{70} \leq -20° C.,$$

where $TR_{10}$ and $TR_{70}$ show temperatures of 10% recovery and 70% recovery from the initial elongation in TR tests, respectively, when samples were initially 50% stretched and vitrified at temperatures below glass transition temperature Tg, followed by slowly elevating the temperatures to relieve the stress.

To satisfy the requirements for $TR_{10}$ and $TR_{70}$, it is desirable that the copolymer composition contains at least 10% by mole, preferably at least 15% by mole, of perfluoro (methyl vinyl ether) as component (c) and perfluorovinyl ether as component (d) in total. Below 10% by mole, the resulting copolymer in a semiresinous state will be obtained or the low-temperature characteristics, particularly $TR_{70}$, will be deteriorated.

The present fluorine-containing elastomer can give curing products with distinguished low-temperature characteristics (glass transition temperature) and solvent resistance (methanol resistance) in addition to the distinguished heat resistance, moldability and compression set characteristics proper to the fluorine-containing elastomer, and thus can be used as effective molding materials for O-rings, oil seals, fuel hoses, etc.

Particularly, curing products obtained by adding fine bituminous powder or flat filler to the fluorine-containing elastomer, followed by peroxide curing have a $TR_{10}$ value (according to JIS K6261) of not more than −30° C. and percent volume change in methanol (according to JIS K6258; at 25° C., 168 hrs) of not more than +50%, and thus have not only distinguished low-temperature characteristics and compression set characteristics, but also distinguished prevention of fuel leakage, particularly against automobile fuel such as gasoline or oxygen-containing fuel, so that they can be used as effective sealing materials for automobile fuel, etc. The fuel oil resistance is effective not only for fuel oils and alcohols, but also such oils as lubricating oil, hydraulic oil, etc. or aromatic or aliphatic hydrocarbons, and thus they can be also used as sealing materials, etc. for vessels containing these oils or hydrocarbons.

PREFERRED EMBODIMENTS OF THE INVENTION

The present invention will be described below, referring to Examples.

REFERENCE EXAMPLE 36 g of cesium fluoride, 360 g of diglyme and 4.18 kg of $CF_3OCF$—$(CF_3)COF$ were charged into a stainless steel autoclave having a capacity of 10 L, provided with a stirrer, and stirred overnight and then cooled to $-10°$ C. Then, 12.0 kg of hexafluoropropene oxide was charged thereto at a feed rate of 150 g/hr. After completion of the feeding, stirring was continued for 2 hours, while keeping the same temperature as above, and then the temperature was returned to room temperature to discontinue the stirring. The autoclave was left standing. Then, only the fluorocarbon phase was carefully withdrawn from the bottom outlet of the autoclave. 15.9 kg of the fluorocarbon phase so obtained was assayed by gas chromatography (GC), and found to have the following composition:

| $CF_3O[CF(CF_3)CF_2O]_nCF(CF_3)COF$ | |
|---|---|
| n | GC (%) |
| 2 | 1 |
| 3 | 27 |
| 4 | 50 |
| 5 | 20 |
| 6 | 2 |

1.2 kg of the fluorocarbon phase so obtained and 1.2 kg of anhydrous potassium carbonate were charged into a glass reactor vessel having a capacity of 10 L, provided with a stirrer, and heated to 130° C. After completion of the carbon dioxide gas generation, the vessel was internally evacuated to 1 Torr to recover unreacted fluorocarbon mixture and a very small amount of diglyme (total 30 g). Vinylation reaction takes place at 200°-270° C. and the resulting liquid was covered by a cold trap. 1.0 kg of the resulting product was analyzed by CG and found to have the following composition. Vinylation reaction takes place substantially quantitatively (90% or more), and the composition proportion undergoes no substantial change before and after the reaction.

| $CF_2$=$CFO[CF_2CF(CF_3)O]_nCF_3$ | |
|---|---|
| n | GC (%) |
| 2 | 1 |
| 3 | 27 |
| 4 | 50 |
| 5 | 20 |
| 6 | 2 |

The resulting vinyl ether compounds were distilled to isolate compounds from one another according to their individual n values. Identification of the compounds was conducted by $^{19}$F-NMR (chemical shift being based on $CFCl_3$).

(n=2)MPr$_2$VE

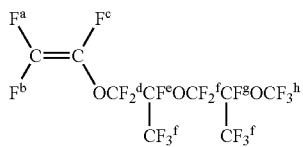

| | δ/ppm |
|---|---|
| $F^a$ | -114.2 |
| $F^b$ | -121.6 |
| $F^c$ | -135.2 |
| $F^d$ | -83.5 |
| $F^e$ | -143.3 |
| $F^f$ | -78.9 |
| $F^g$ | -144.4 |
| $F^h$ | -52.8 |

(n=3)MPr$_3$VE

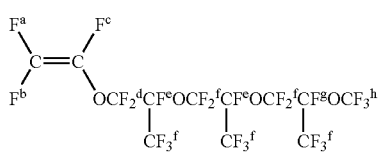

| | δ/ppm |
|---|---|
| $F^a$ | -114.2 |
| $F^b$ | -121.6 |
| $F^c$ | -135.3 |
| $F^d$ | -83.5 |
| $F^e$ | -143.2 |
| $F^f$ | -78.9 |
| $F^g$ | -144.5 |
| $F^h$ | -52.9 |

(n=4)MPr$_4$VE

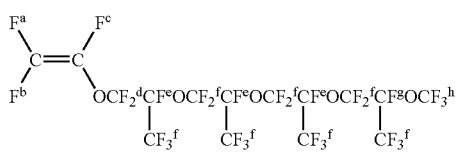

| | δ/ppm |
|---|---|
| $F^a$ | -114.2 |
| $F^b$ | -121.6 |
| $F^c$ | -135.3 |
| $F^d$ | -83.4 |
| $F^e$ | -143.1 |
| $F^f$ | -78.8 |
| $F^g$ | -144.5 |
| $F^h$ | -52.9 |

(n=5)MPr$_5$VE

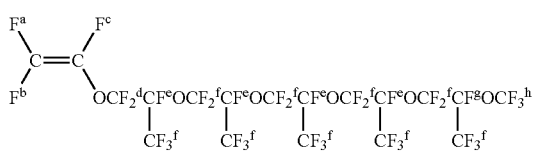

-continued

| | δ/ppm |
|---|---|
| $F^a$ | -114.1 |
| $F^b$ | -121.7 |
| $F^c$ | -135.3 |
| $F^d$ | -83.5 |
| $F^e$ | -143.1 |
| $F^f$ | -78.9 |
| $F^g$ | -144.5 |
| $F^h$ | -52.9 |

(n=6)MPr₆VE

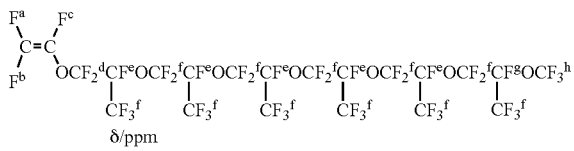

| | δ/ppm |
|---|---|
| $F^a$ | -114.1 |
| $F^b$ | -121.6 |
| $F^c$ | -135.3 |
| $F^d$ | -83.5 |
| $F^e$ | -143.1 |
| $F^f$ | -78.8 |
| $F^g$ | -144.5 |
| $F^h$ | -52.9 |

EXAMPLE 1

A stainless steel autoclave having a capacity of 500 ml was internally flushed with a nitrogen gas and then subjected to degassing. Then, the following reaction media were charged into the autoclave:

| | |
|---|---|
| Surfactant | 30 g |
| $CF_3CF_2CF_2OCF(CF_3)CF_2OCF(CF_3)COONH_4$ | |
| $Na_2HPO_4 \cdot 12H_2O$ | 0.5 g |
| Ion-exchanged water | 250 ml |

Then, the autoclave was again internally flushed with a nitrogen gas, and after degassing thereof the following reactants were charged thereto:

| | |
|---|---|
| Vinylidene fluoride [VdF] | 40 g (68.1%) |
| Tetrafluoroethylene [TFE] | 6 g (6.5%) |
| Perfluoro(methyl vinyl ether) [FMVE] | 24 g (15.8%) |
| $CF_2$=$CFOCF_2CF(CF_3)OCF_2CF(CF_3)OCF_3$ [MPr₂VE] | 40 g (8.8%) |
| $CF_2$=$CFOCF_2CF_2Br$ [FBrVE] | 2 g (0.8%) |
| $ICF_2CF_2CF_2CF_2I$ [DIOFB] | 0.5 g |

Percentage in parentheses are by mole.

Then, the inside temperature of the autoclave was set to 50° C., and 0.01 g of sodium hydrogen sulfite and 0.05 g of ammonium persulfate, each in 0.3 wt. % aqueous solutions, were added thereto to initiate polymerization reaction. After the reaction was conducted for 2 hours, the autoclave was cooled and the remaining gas was discharged, while the resulting emulsion liquid was recovered. An aqueous 5 wt. % calcium chloride solution was added to the emulsion liquid to coagulate polymers, followed by water washing and drying. 108 g of elastomeric copolymer having the following composition (by ¹⁹F-NMR) was obtained.

| | |
|---|---|
| VdF | 71 mol. % |
| TFE | 7 mol. % |
| FMVE | 14 mol. % |
| MPr₂VE | 7.2 mol. % |
| FBrVE | 0.8 mol. % |

To 100 parts by weight of the thus obtained elastomeric copolymer were added the following components:

| | |
|---|---|
| MT carbon black (Thermax N990, Cancab product) | 30 parts by weight |
| Triallyl isocyanulate (TAIC M60, Nihon Kasei product) | 6 parts by weight |
| Organic peroxide (Perhexa 25B-40, NOF Corp. product) | 1.4 parts by weight |
| ZnO | 4 parts by weight |

The mixture was blended by a two-roll mill, and the resulting curable composition was compression molded at 180° C. for 10 minutes to obtain 2 mm-thick sheets and O-rings (P24), and further subjected to secondary curing (oven curing) at 200° C. for 10 hours.

The following tests were conducted in the stage of curing and also for the resulting curing products:

- Hardening test: $t_{10}$, $t_{90}$, ML, and MH values at 180° C. were determined with Monsanto rheometer
- Normal state physical properties: determined according to JIS K6250 and 6253
- Compression set: determined by subjecting P24 O-rings to conditions at 200° C. for 70 hours according to ASTM D395, Method B
- Low-temperature characteristics: $TR_{10}$ and $TR_{70}$ values were determined according to ASTM D1329
- Methanol swelling test: Percent volume change (methanol swelling rate) was determined by dipping into methanol at 25° C. for 70 hours

EXAMPLES 2 TO 6 AND COMPARATIVE EXAMPLES 1 TO 2

In Example 1, reaction media, reactants and reaction conditions were changed as in the following Table 1, where amount of the resulting elastomeric copolymers, copolymer compositions, solution viscosity η sp/c and glass transition temperature Tg (determined with SEIKO I SSC5200) are shown together. In Comparative Example 1, the resulting copolymer failed in complete dissolution in methyl ethyl ketone, and thus the solution viscosity η sp/c could not be determined (determination in hexafluorobenzene solution, which will be later mentioned, was not carried out).

TABLE 1

| | | Example | | | | | Comp. Ex. | |
|---|---|---|---|---|---|---|---|---|
| | | 2 | 3 | 4 | 5 | 6 | 1 | 2 |
| [Reaction media] | | | | | | | | |
| Surfactant | (g) | 40 | 40 | 40 | 40 | 40 | 40 | 2 |
| $Na_2HPO_4 \cdot 12H_2O$ | (g) | 0.5 | 0.5 | 0.5 | 0.5 | 0.5 | 0.5 | 0.5 |
| Ion-exchanged water | (ml) | 250 | 250 | 250 | 250 | 250 | 250 | 250 |
| [Reactant] | | | | | | | | |
| VdF | (g) | 40 | 40 | 40 | 46 | 46 | 40 | 40 |
| TFE | (g) | 6 | 6 | 6 | — | — | 6 | 9 |
| FMVE | (g) | 20 | 24 | 16 | 24 | 24 | — | 30 |
| $MPr_2VE$ | (g) | 26 | — | — | 40 | — | — | — |
| $MPr_3VE$ | (g) | 14 | 40 | 48 | — | 40 | 64 | — |
| FBrVE | (g) | 2 | 2 | 2 | 2 | 2 | 2 | 2 |
| DIOFB | (g) | 0.5 | 0.5 | 0.5 | 0.5 | 0.5 | 0.5 | 0.5 |
| [Reaction conditions] | | | | | | | | |
| Temperature | (° C.) | 50 | 50 | 50 | 50 | 50 | 50 | 50 |
| Time | (hrs) | 14 | 17 | 20 | 15 | 20 | 17 | 12 |
| [Copolymer amount] | | | | | | | | |
| Product | (g) | 110 | 107 | 106 | 103 | 105 | 101 | 78 |
| [Copolymer composition] | | | | | | | | |
| VdF | (mol. %) | 72 | 72 | 75 | 84 | 83 | 82 | 72 |
| TFE | (mol. %) | 7 | 7 | 7 | — | — | 8 | 10 |
| FMVE | (mol. %) | 14 | 16 | 11 | 10 | 11 | — | 17 |
| $MPr_2VE$ | (mol. %) | 4.2 | — | — | 5.3 | — | — | — |
| $MPr_3VE$ | (mol. %) | 2 | 4.2 | 6.2 | — | 5.2 | 9.1 | — |
| FBrVE | (mol. %) | 0.8 | 0.8 | 0.8 | 0.7 | 0.8 | 0.9 | 1.0 |
| [Solution viscosity] | | | | | | | | |
| η sp/c | (dl/g) | 0.60 | 0.55 | 0.51 | 0.65 | 0.56 | failed to determine | 0.9 |
| [Glass transition temp.] | | | | | | | | |
| Tg | (° C.) | −33.5 | −34.2 | −35.0 | −36.6 | −36.9 | −37.0 | −31.5 |

Curable compositions were prepared and cured in the same manner as in Example 1, using the elastomeric copolymers obtained in Examples 2 to 6 and Comparative Examples 1 to 2, and test results measured in the stage of curing and the curing products are given in the following Table 2 together with those of Example 1.

TABLE 2

| | | Example | | | | | | Com. Ex. | |
|---|---|---|---|---|---|---|---|---|---|
| Determination items | | 1 | 2 | 3 | 4 | 5 | 6 | 1 | 2 |
| [Hardening test] | | | | | | | | | |
| $t_{10}$ | (min.) | 0.5 | 0.5 | 0.6 | 0.6 | 0.6 | 0.6 | 0.6 | 0.5 |
| $t_{90}$ | (min.) | 1.4 | 1.6 | 1.6 | 1.8 | 1.8 | 2.5 | 1.6 | 1.5 |
| ML | (dN · m) | 0.8 | 0.6 | 0.7 | 0.4 | 0.6 | 1.1 | 0.4 | 0.6 |
| MH | (dN · m) | 13.6 | 13.9 | 12.5 | 11.4 | 13.3 | 15.5 | 8.3 | 18.0 |
| [Normal state physical properties] | | | | | | | | | |
| Hardness | | 72 | 68 | 67 | 68 | 65 | 67 | 75 | 70 |
| 100% modulus | (MPa) | — | — | — | — | 5.0 | 6.5 | 6.0 | 5.7 |
| Strength at break | (MPa) | 9.6 | 10.4 | 8.4 | 7.2 | 11.6 | 10.7 | 7.4 | 15.0 |
| Elongation at break | (%) | 160 | 160 | 150 | 150 | 170 | 150 | 120 | 200 |
| Specific gravity | | 1.87 | 1.86 | 1.86 | 1.87 | 1.87 | 1.87 | 1.87 | 1.87 |

TABLE 2-continued

| Determination items | | Example | | | | | | Com. Ex. | |
|---|---|---|---|---|---|---|---|---|---|
| | | 1 | 2 | 3 | 4 | 5 | 6 | 1 | 2 |
| [Compression set] | | | | | | | | | |
| 200° C., 70 hrs | (%) | 39 | 27 | 30 | 29 | 34 | 33 | 34 | 29 |
| [Low-temperature characteristics] | | | | | | | | | |
| $TR_{10}$ | (° C.) | −31.7 | −32.5 | −33.5 | −34.3 | −33.9 | −35.8 | −35.7 | −30.0 |
| $TR_{70}$ | (° C.) | −22.8 | −24.2 | −23.3 | −20.1 | −23.3 | −24.7 | +2.5 | −20.0 |
| [Methanol swelling test] | | | | | | | | | |
| Percent volume change | (%) | +21 | +13 | +20 | +15 | +39 | +33 | +9 | +100 |

EXAMPLES 7 TO 11 AND COMPARATIVE EXAMPLE 3

In Example 1, the amounts of sodium sulfite and ammonium persulfate were changed to 0.04 g and 0.2 g, respectively, and the reaction media, reactants and reaction conditions were changed as in the following Table 3, where amount of the resulting elastomeric copolymer, copolymer compositions, solution viscosity η sp/c and glass transition temperature are given together. In Comparative Example 3, the resulting copolymer failed in complete dissolution, and thus the solution viscosity η sp/c could not be determined (determination in hexafluorobenzene, which will be later mentioned, was not carried out).

TABLE 3

| | | Example | | | | | Com. Ex. |
|---|---|---|---|---|---|---|---|
| | | 7 | 8 | 9 | 10 | 11 | 3 |
| [Reaction medium] | | | | | | | |
| Surfactant | (g) | 40 | 40 | 40 | 40 | 40 | 40 |
| $Na_2HPO_4 \cdot 12H_2O$ | (g) | 0.5 | 0.5 | 0.5 | 0.5 | 0.5 | 0.5 |
| Ion-exchanged water | (ml) | 200 | 200 | 200 | 200 | 200 | 200 |
| [Reactants] | | | | | | | |
| VdF | (g) | 42 | 42 | 42 | 42 | 42 | 42 |
| FMVE | (g) | 28 | 24 | 20 | 18 | 24 | — |
| $MPr_3VE$ | (g) | — | — | — | — | 22 | — |
| $MPr_4VE$ | (g) | 44 | 44 | 44 | 50 | 22 | 68 |
| FBrVE | (g) | 2 | 2 | 2 | 2 | 2 | 2 |
| DIOFB | (g) | 0.5 | 0.5 | 0.5 | 0.5 | 0.5 | 0.5 |
| [Reaction conditions] | | | | | | | |
| Temperature | (° C.) | 50 | 50 | 50 | 50 | 50 | 50 |
| Time | (hrs) | 10 | 10 | 10 | 10 | 10 | 10 |
| [Copolymer amount] | | | | | | | |
| Product | (g) | 114 | 110 | 108 | 115 | 107 | 110 |
| [Copolymer Composition] | | | | | | | |
| VdF | (mol. %) | 78 | 80 | 81 | 82 | 80 | 90 |
| FMVE | (mol. %) | 17 | 15 | 14 | 12 | 14 | — |
| $MPr_3VE$ | (mol. %) | — | — | — | — | 3 | — |
| $MPr_4VE$ | (mol. %) | 4.2 | 4.2 | 4.2 | 5.3 | 2.2 | 9 |
| FBrVE | (mol. %) | 0.8 | 0.8 | 0.8 | 0.7 | 0.8 | 1.0 |
| [Solution viscosity] | | | | | | | |
| η sp/c | (dl/g) | 0.41 | 0.31 | 0.45 | 0.40 | 0.46 | failed to determine |
| [Glass transition temperature] | | | | | | | |
| Tg | (° C.) | −38.6 | −39.2 | −39.6 | −40.2 | −38.7 | −41.0 |

Curable compositions were prepared and cured in the same manner as in Example 1, using elastomeric copolymers obtained in Examples 7 to 11 and Comparative Example 3, and test results measured in the stage of curing and the curing products are given in the following Table 4.

After the reaction was conducted for 10 hours, the autoclave was cooled, and the remaining gas was discharged, while the emulsion liquid was withdrawn. An aqueous 5 wt. % calcium chloride solution was added to the emulsion liquid to coagulate the polymers, followed by water washing and drying. 123 g of elastomeric copolymer having the following composition (by $^{19}$F-NMR) was obtained.

TABLE 4

| Determination items | | 7 | 8 | 9 | 10 | 11 | Comp. Ex 3 |
|---|---|---|---|---|---|---|---|
| [Hardening test] | | | | | | | |
| $t_{10}$ | (min.) | 0.5 | 0.5 | 0.5 | 0.5 | 0.5 | 0.5 |
| $t_{90}$ | (min.) | 1.7 | 1.7 | 1.7 | 1.7 | 1.5 | 2.0 |
| ML | (dN · m) | 0.4 | 0.4 | 0.5 | 0.3 | 0.6 | 0.3 |
| MH | (dN · m) | 10.0 | 10.0 | 9.9 | 9.7 | 9.7 | 9.0 |
| [Normal state physical properties] | | | | | | | |
| Hardness | | 67 | 65 | 66 | 68 | 65 | 77 |
| 100% modulus | (MPa) | 5.8 | 5.1 | 5.5 | 6.1 | 5.4 | 8.0 |
| Strength at break | (MPa) | 11.8 | 10.1 | 12.1 | 10.9 | 10.6 | 9.5 |
| Elongation at break | (%) | 160 | 150 | 150 | 150 | 150 | 120 |
| Specific gravity | | 1.87 | 1.87 | 1.86 | 1.86 | 1.87 | 1.87 |
| [Compression set] | | | | | | | |
| 200° C., 70 hrs | (%) | 32 | 30 | 31 | 31 | 30 | 37 |
| [Low-temperature characteristics] | | | | | | | |
| $TR_{10}$ | (° C.) | −36.9 | −37.5 | −37.1 | −37.8 | −37.4 | −38.7 |
| $TR_{70}$ | (° C.) | −26.4 | −28.4 | −26.0 | −26.0 | −28.4 | −1.0 |
| [Methanol swelling test] | | | | | | | |
| Percent volume change | (%) | +32 | +26 | +34 | +24 | +30 | +13 |

EXAMPLE 12

A stainless steel autoclave having a capacity of 500 ml was internally flushed with a nitrogen gas and subjected to degassing, and then the following reaction media were charged thereto:

| | |
|---|---|
| Surfactant CF$_3$CF$_2$CF$_2$OCF(CF$_3$)CF$_2$OCF(CF$_3$)COONH$_4$ | 40 g |
| Na$_2$HPO$_4$•12H$_2$O | 0.5 g |
| Ion-exchanged water | 200 ml |

Then, the autoclave was internally flushed again with the nitrogen gas and subjected to degassing, and then the following reactants were charged thereto:

| | |
|---|---|
| Vinylidene fluoride [VdF] | 42 g (77.53%) |
| Perfluoro(methyl vinyl ether) [FMVE] | 18 g (12.81%) |
| CF$_2$=CFOCF$_2$CF(CF$_3$)OCF$_2$CF(CF$_3$)OCF$_2$CF(CF$_3$)OCF$_2$CF(CF$_3$)OCF$_3$ [MPr$_4$VE] | 64 g (9.25%) |
| CF$_2$=CFI | 0.5 g (0.28%) |
| CF$_2$=CFOCF$_2$CF(CF$_3$)OCF$_2$CF$_2$OCF=CF$_2$ [FDVE] | 0.5 g (0.13%) |
| ICF$_2$CF$_2$CF$_2$CF$_2$I [DIOFB] | 0.5 g |

Percentage in parentheses is by mole.

Then, the inside temperature of the autoclave was set to 50° C., and 0.1 g of sodium hydrogen sulfite and 0.5 g of ammonium persulfate, each in aqueous 3 wt. % solutions, were added thereto to initiate the polymerization reaction.

| | |
|---|---|
| VdF | 86 mol. % |
| FMVE | 8 mol. % |
| MPr$_4$VE | 5.7 mol. % |
| FDVE | 0.3 mol. % |

Solution viscosity η sp/c of the resulting elastomeric copolymer was found to be 0.30 dl/g, and glass transition temperature Tg (determined with SEIKO I SSC5200) was found to be −41.3° C.

EXAMPLE 13

Polymerization reaction was conducted under the same conditions as in Example 12, except that the following reactants were used:

| | |
|---|---|
| VdF | 42 g (77.64%) |
| FMVE | 18 g (12.83%) |
| MPr$_4$VE | 65 g (9.27%) |
| CF$_2$=CFI | 0.5 g (0.28%) |
| ICF$_2$CF$_2$CF$_2$CF$_2$I | 0.5 g |

123 g of elastomeric copolymer was obtained, and had the same composition as in Example 12 (VdF: 86 mol. %, FMVE: 8 mol. % and MPr$_4$VE: 6 mol. % by $^{19}$F-NMR) with the solution viscosity η sp/c of 0.28 dl/g and the glass transition temperature Tg of −41.6° C.

Curable compositions were prepared and cured in the same manner as in Example 1, using the elastomeric copolymers obtained in Examples 12 and 13. Test results measured in the stage of curing and the curing products are given in the following Table 5, where the compression molding temperature was changed to 170° C. and the secondary curing time to 4 hours.

TABLE 5

| Determination item | | Example 12 | Example 13 |
|---|---|---|---|
| [Hardening test] | | | |
| $t_{10}$ | (min.) | 0.7 | 0.7 |
| $t_{90}$ | (min.) | 1.9 | 1.9 |
| ML | (dN · m) | 0.3 | 0.2 |
| MH | (dN · m) | 8.1 | 6.6 |
| [Normal state physical properties] | | | |
| Hardness | | 67 | 66 |
| 100% modulus | (MPa) | 7.1 | 5.3 |
| Strength at break | (MPa) | 7.9 | 8.4 |
| Elongation at break | (%) | 110 | 140 |
| Specific gravity | | 1.87 | 1.87 |
| [Compression set] | | | |
| 200° C., 70 hrs | (%) | 35 | 44 |
| [Low-temperature characteristics] | | | |
| $TR_{10}$ | (° C.) | −39.2 | −39.5 |
| $TR_{70}$ | (° C.) | −24.7 | −25.5 |
| [Methanol swelling test] | | | |
| Percent volume change | (%) | +14 | +14 |

EXAMPLE 14 AND COMPARATIVE EXAMPLE 4

In Example 1, the reaction media, reactants and reaction conditions were changed as in the following Table 6, where amount of the resulting elastomeric copolymers, copolymer compositions, solution viscosity η sp/c and glass transition temperature Tg are shown together, and $FP_3VE$ is a compound having the following chemical formula:

TABLE 6

$CF_2=CFOCF_2CF(CF_3)OCF_2CF(CF_3)OCF_2CF_2CF_3$

| | | Example 14 | Comp. Ex. 4 |
|---|---|---|---|
| [Reaction media] | | | |
| Surfactant | (g) | 30 | 30 |
| $Na_2HPO_4 \cdot 12H_2O$ | (g) | 0.5 | 0.5 |
| Ion-exchanged water | (ml) | 220 | 220 |
| [Reactants] | | | |
| VdF | (g) | 42 | 42 |
| FMVE | (g) | 24 | 24 |
| $MPr_2VE$ | (g) | 44 | — |
| $FP_3VE$ | (g) | — | 44 |
| FBrVE | (g) | 1.0 | 1.0 |
| DIOFB | (g) | 0.5 | 0.5 |
| [Reaction conditions] | | | |
| Temperature | (° C.) | 50 | 50 |
| Time | (hrs) | 12 | 12 |

TABLE 6-continued $CF_2=CFOCF_2CF(CF_3)OCF_2CF(CF_3)OCF_2CF_2CF_3$

| | | Example 14 | Comp. Ex. 4 |
|---|---|---|---|
| [Copolymer amount] | | | |
| Product | (g) | 110 | 108 |
| [Copolymer composition] | | | |
| VdF | (mol. %) | 80 | 80 |
| FMVE | (mol. %) | 13 | 14 |
| $MPr_2VE$ | (mol. %) | 6.6 | — |
| $FP_3VE$ | (mol. %) | — | 5.6 |
| FBrVE | (mol. %) | 0.4 | 0.4 |
| [Solution viscosity] | | | |
| η sp/c | (dl/g) | 0.62 | 0.39 |
| [Glass transition temperature] | | | |
| Tg | (° C.) | −35.2 | −36.0 |

Curable compositions were prepared and cured in the same manner as in Example 1, using the elastomeric copolymer obtained in Example 14 and Comparative Example 4. Test results measured in the stage of compression molding and the curing products are given in the following Table 7. Considerable blister was observed on the test piece of Comparative Example 4.

TABLE 7

| Determination item | | Example 14 | Comp. Ex. 4 |
|---|---|---|---|
| [Hardening test] | | | |
| $t_{10}$ | (min.) | 0.5 | 0.5 |
| $t_{90}$ | (min.) | 1.7 | 1.8 |
| ML | (dN · m) | 0.4 | 0.3 |
| MH | (dN · m) | 11.0 | 8.0 |
| [Normal state physical properties] | | | |
| Hardness | | 67 | 63 |
| 100% modulus | (MPa) | 3.7 | 2.1 |
| Strength at break | (MPa) | 9.3 | 2.3 |
| Elongation at break | (%) | 180 | 110 |
| Specific gravity | | 1.87 | 1.84 |
| [Compression set] | | | |
| 200° C., 70 hrs | (%) | 39 | 58 |
| [Low-temperature characteristics] | | | |
| $TR_{10}$ | (° C.) | −33.1 | −34.0 |
| $TR_{70}$ | (° C.) | −23.8 | −17.7 |
| [Methanol swelling test] | | | |
| Percent volume change | (%) | +28 | +28 |

EXAMPLES 15 TO 17

In Example 1, the reaction media, reaction initiator, reactants and reaction conditions were changed as in the following Table 8, where amount of the resulting elastomeric copolymers, copolymer compositions, solution viscosity η sp/c and glass transition temperature Tg are shown together. When the resulting copolymers failed in complete dissolution in methyl ethyl ketone at 35° C. as 1 wt. % methyl ethyl ketone solutions, the solution viscosity η sp/c was determined as 1 wt. % hexafluorobenzene solutions at 35° C., and the determined viscosities are shown in parentheses.

TABLE 8

|  |  | Example 15 | Example 16 | Example 17 |
|---|---|---|---|---|
| [Reaction media] | | | | |
| Surfactant | (g) | 40 | 40 | 40 |
| $Na_2HPO_4 \cdot 12H_2O$ | (g) | 0.5 | 0.5 | 0.5 |
| Ion-exchanged water | (ml) | 180 | 180 | 180 |
| [Reaction initiator] | | | | |
| Ammonium persulfate | (g) | 0.25 | 0.25 | 0.25 |
| $Na_2SO_3$ | (g) | 0.05 | 0.05 | 0.05 |
| [Reactants] | | | | |
| VdF | (g) | 24 | 24 | 24 |
| TFE | (g) | 12 | 12 | 12 |
| FMVE | (g) | 14 | 14 | 14 |
| $MPr_5VE$ | (g) | 64 | 72 | 72 |
| FBrVE | (g) | 2 | 2.5 | 2.5 |
| DIOFB | (g) | — | 0.07 | 0.14 |
| [Reaction conditions] | | | | |
| Temperature | (° C.) | 33 | 33 | 33 |
| Time | (hrs) | 12 | 12 | 12 |
| [Copolymer amount] | | | | |
| Product | (g) | 105 | 113 | 111 |
| [Copolymer composition] | | | | |
| VdF | (mol. %) | 62 | 61 | 61 |
| TFE | (mol. %) | 16 | 16 | 16 |
| FMVE | (mol. %) | 11 | 11 | 11 |
| $MPr_5VE$ | (mol. %) | 10.0 | 10.7 | 10.7 |
| FBrVE | (mol. %) | 1.0 | 1.3 | 1.3 |
| [Solution viscosity] | | | | |
| η sp/c | (dl/g) | (1.38) | (0.73) | (0.64) |
| [Glass transition temperature] | | | | |
| Tg | (° C.) | −40.9 | −41.9 | −42.6 |

Curable compositions were prepared and cured in the same manner as in Example 1, using the elastomeric copolymers as obtained in Examples 15 to 17, and test results measured in the stage of curing and the curing products (where the amount of organic peroxide was changed to 2 parts by weight and the secondary curing conditions were changed to 230° C., 20 hours) are shown in the following Table 9:

TABLE 9

| Determination item | | Example 15 | Example 16 | Example 17 |
|---|---|---|---|---|
| [Hardening test] | | | | |
| $t_{10}$ | (min.) | 0.5 | 0.5 | 0.5 |
| $t_{90}$ | (min.) | 2.1 | 1.9 | 1.9 |
| ML | (dN · m) | 2.6 | 1.1 | 0.7 |
| MH | (dN · m) | 11.4 | 10.0 | 9.5 |
| [Normal state physical properties] | | | | |
| Hardness | | 62 | 60 | 61 |
| 100% modulus | (MPa) | 4.3 | 3.7 | 4.8 |
| Strength at break | (MPa) | 11.5 | 10.5 | 9.7 |
| Elongation at break | (%) | 180 | 190 | 170 |
| Specific gravity | | 1.90 | 1.90 | 1.90 |
| [Compression set] | | | | |
| 200° C., 70 hrs | (%) | 27 | 35 | 36 |
| [Low-temperature characteristics] | | | | |
| $TR_{10}$ | (° C.) | −38.3 | −39.6 | −40.6 |
| $TR_{70}$ | (° C.) | −24.6 | −29.4 | −29.0 |
| [Methanol swelling test] | | | | |
| Percent volume change | (%) | +4.0 | +4.2 | +8.1 |

EXAMPLES 18 TO 22

In Example 1, the reaction media, reaction initiators, reactants and reaction conditions were changed as in the following Table 10, where amount of the resulting elastomeric copolymers, copolymer compositions, solution viscosity η sp/c and glass transition temperature Tg are shown together, and ITrFE is a compound having the following chemical formula:

$$CF_2=CFI$$

The solution viscosity η sp/c of Examples 18-20 and 22 were determined as 1 wt. % hexafluorobenzene solutions (35° C.) for the same reasons as above.

TABLE 10

| | | Example | | | | |
|---|---|---|---|---|---|---|
| | | 18 | 19 | 20 | 21 | 22 |
| [Reaction media] | | | | | | |
| Surfactant | (g) | 40 | 40 | 40 | 30 | 40 |
| $Na_2HPO_4 \cdot 12H_2O$ | (g) | 0.5 | 0.5 | 0.5 | 0.5 | 0.5 |
| Ion-exchanged water | (ml) | 200 | 170 | 200 | 170 | 200 |

TABLE 10-continued

|  |  | Example |  |  |  |  |
|---|---|---|---|---|---|---|
|  |  | 18 | 19 | 20 | 21 | 22 |
| [Reaction initiators] | | | | | | |
| Ammonium persulfate | (g) | 0.25 | 0.25 | 0.25 | 0.13 | 0.25 |
| $Na_2SO_3$ | (g) | 0.05 | 0.05 | 0.05 | 0.02 | 0.05 |
| [Reactants] | | | | | | |
| VdF | (g) | 26 | 24 | 30 | 34 | 24 |
| TFE | (g) | 12 | 14 | 8 | 24 | 14 |
| FMVE | (g) | 14 | 14 | 14 | 32 | 14 |
| $MPr_3VE$ | (g) | — | 12 | — | — | — |
| $MPr_4VE$ | (g) | — | 40 | 64 | 40 | — |
| $MPr_5VE$ | (g) | 72 | 12 | — | — | 72 |
| FBrVE | (g) | 2 | 2 | 2 | 1.5 | — |
| DIOFB | (g) | — | — | — | 0.25 | 0.15 |
| ITrFE | (g) | — | — | — | — | 0.50 |
| [Reaction conditions] | | | | | | |
| Temperature | (° C.) | 33 | 33 | 50 | 50 | 40 |
| Time | (hrs) | 12 | 12 | 12 | 12 | 12 |
| [Copolymer amount] | | | | | | |
| Product | (g) | 111 | 103 | 112 | 124 | 103 |
| [Copolymer Composition] | | | | | | |
| VdF | (mol. %) | 65 | 62 | 70 | 57 | 61 |
| TFE | (mol. %) | 16 | 18 | 10 | 20 | 19 |
| FMVE | (mol. %) | 10 | 10 | 10 | 18 | 10 |
| $MPr_3VE$ | (mol. %) | — | 2 | — | — | — |
| $MPr_4VE$ | (mol. %) | — | 6 | 9 | 4.5 | — |
| $MPr_5VE$ | (mol. %) | 8 | 1 | — | — | 9.6 |
| ITrFE | (mol. %) | — | — | — | — | 0.4 |
| FBrVE | (mol. %) | 1 | 1 | 1 | 0.5 | — |
| [Solution viscosity] | | | | | | |
| η sp/c | (dl/g) | (3.36) | (4.63) | (4.83) | 0.55 | (0.67) |
| [Glass transition temperature] | | | | | | |
| Tg | (° C.) | −41.9 | −39.5 | −40.0 | −35.6 | −44.1 |

Curable compositions were prepared and cured in the same manner as in Example 1, using the elastomeric copolymers obtained in Examples 18 to 22, and test results measured in the stage of curing and the curing products (where in Examples 18 and 19 the amount of organic peroxide was changed to 2 parts by weight, in Examples 18 to 20 the secondary curing conditions were changed to 230° C., 20 hours, and in Example 21 the compression molding temperature was changed to 170° C. and the secondary curing time was changed to 4 hours) are shown in the following Table 11:

TABLE 11

| Determination | | Example | | | | |
|---|---|---|---|---|---|---|
| items | | 18 | 19 | 20 | 21 | 22 |
| [Hardening test] | | | | | | |
| $t_{10}$ | (min.) | 0.6 | 0.5 | 0.5 | 0.5 | 0.5 |
| $t_{90}$ | (min.) | 2.4 | 2.4 | 2.4 | 1.6 | 1.9 |
| ML | (dN · m) | 1.3 | 1.7 | 1.7 | 2.4 | 0.4 |
| MH | (dN · m) | 8.2 | 9.6 | 10.0 | 18.5 | 7.4 |
| [Normal state physical properties] | | | | | | |
| Hardness | | 59 | 61 | 60 | 68 | 62 |
| 100% modulus | (MPa) | 3.0 | 3.4 | 2.8 | 5.1 | 5.4 |
| Strength at break | (MPa) | 9.4 | 9.2 | 10.1 | 13.5 | 7.0 |
| Elongation at break | (%) | 200 | 190 | 220 | 200 | 120 |
| Specific gravity | | 1.90 | 1.90 | 1.89 | 1.88 | 1.89 |
| [Compression set] | | | | | | |
| 200° C., 70 hrs | (%) | 31 | 31 | 28 | 28 | 27 |
| [Low-temperature characteristics] | | | | | | |
| $TR_{10}$ | (° C.) | −39.1 | −37.0 | −37.9 | −33.7 | −41.0 |
| $TR_{70}$ | (° C.) | −24.1 | −23.4 | −28.8 | −26.9 | −28.3 |
| [Methanol swelling test] | | | | | | |
| Percent volume change | (%) | +3.3 | +3.0 | +5.1 | +3.4 | +3.2 |

EXAMPLES 23 TO 25

In Example 1, reaction media, reaction initiators, reactants and reaction conditions were changed as in the following Table 12, where amount of the resulting elastomeric copolymers, copolymer compositions, solution viscosity η sp/c and glass transition temperature Tg are shown together, and BDFE is a compound having the following chemical formula:

$$CF_2=CHBr$$

The solution viscosity η sp/c of Example 23 was determined as a 1 wt. % hexafluorobenzene solution (35° C.) for the same reasons as above.

TABLE 12

| | | Example | | |
|---|---|---|---|---|
| | | 23 | 24 | 25 |
| [Reaction media] | | | | |
| Surfactant | (g) | 40 | 40 | 40 |
| $Na_2HPO_4 \cdot 12H_2O$ | (g) | 0.5 | 0.5 | 0.5 |
| Ion-exchanged water | (ml) | 170 | 210 | 210 |
| [Reaction initiators] | | | | |
| Ammonium persulfate | (g) | 0.25 | 0.45 | 0.35 |
| $NaHSO_3$ | (g) | 0.05 | 0.09 | 0.07 |
| [Reactants] | | | | |
| VdF | (g) | 30 | 28 | 30 |
| TFE | (g) | 8 | 10 | 8 |
| FMVE | (g) | 14 | 20 | 14 |
| $MPr_4VE$ | (g) | — | — | 64 |
| $MPr_5VE$ | (g) | 72 | 30 | — |
| $MPr_6VE$ | (g) | — | 10 | — |
| FBrVE | (g) | 2.5 | 2.5 | — |
| BDFE | (g) | — | — | 1.0 |
| DIOFB | (g) | — | 0.08 | 0.1 |
| [Reaction conditions] | | | | |
| Temperature | (° C.) | 35 | 50 | 50 |
| Time | (hrs) | 12 | 12 | 12 |
| [Copolymer amount] | | | | |
| Product | (g) | 115 | 89 | 109 |
| [Copolymer Composition] | | | | |
| VdF | (mol. %) | 70 | 66 | 70 |
| TFE | (mol. %) | 10 | 13 | 10 |
| FMVE | (mol. %) | 10 | 15 | 10 |
| $MPr_4VE$ | (mol. %) | — | — | 9 |
| $MPr_5VE$ | (mol. %) | 9 | 4 | — |
| $MPr_6VE$ | (mol. %) | — | 1 | — |
| FBrVE | (mol. %) | 1 | 1 | — |
| BDFE | (mol. %) | — | — | 1 |
| [Solution viscosity] | | | | |
| η sp/c | (dl/g) | (1.23) | 0.33 | 0.10 |
| [Glass transition temperature] | | | | |
| Tg | (° C.) | −42.5 | −38.5 | −41.6 |

Curable compositions were prepared and cured in the same manner as in Example 1, using the elastomeric copolymers obtained in Examples 23 to 25, and test results measured in the stage of curing and the curing products (where the amount of organic peroxide was changed to 2 parts by weight, and the secondary curing conditions were changed to 230° C., 20 hours) are shown in the following Table 13. In Example 25, very slight blister was observed on the surface of 2 mm-thick sheets in the stage of molding.

TABLE 13

| | | Example | | |
|---|---|---|---|---|
| Determination item | | 23 | 24 | 25 |
| [Hardening test] | | | | |
| $t_{10}$ | (min.) | 0.5 | 0.5 | 0.5 |
| $t_{90}$ | (min.) | 2.6 | 2.1 | 3.0 |
| ML | (dN · m) | 2.0 | 2.1 | 0.3 |
| MH | (dN · m) | 10.7 | 16.4 | 6.4 |
| [Normal state physical properties] | | | | |
| Hardness | | 59 | 66 | 58 |
| 100% modulus | (MPa) | 4.5 | 8.1 | 3.1 |
| Strength at break | (MPa) | 11.3 | 13.9 | 8.2 |
| Elongation at break | (%) | 180 | 140 | 200 |
| Specific gravity | | 1.89 | 1.88 | 1.88 |
| [Compression set] | | | | |
| 200° C., 70 hrs | (%) | 24 | 25 | 41 |
| [Low-temperature characteristics] | | | | |
| $TR_{10}$ | (° C.) | −40.3 | −36.6 | −38.5 |
| $TR_{70}$ | (° C.) | −28.7 | −27.7 | −22.0 |
| [Methanol swelling test] | | | | |
| Percent volume change | (%) | +4.3 | +9.8 | +6.0 |

EXAMPLE 26

| | |
|---|---|
| Fluorine-containing elastomer of Example 1 | 100 parts by weight |
| MT carbon black (Thermax N990) | 40 parts by weight |
| Calcium hydroxide | 5 parts by weight |
| 2,5-dimethyl-2,5-di(t-butylperoxy) hexane | 2 parts by weight |
| Triallyl isocyanurate | 5 parts by weight |

The foregoing components were kneaded by a kneader and an open roll, and the resulting curable composition was compression molded at 170° C. for 20 minutes to obtain 2 mm-thick sheets and O-rings (P24), followed by secondary curing (oven curing) at 160° C. for 2 hours.

The resulting curing products were subjected to the following tests:

Normal state physical properties: determined according to JIS K6253 and 6251

Low-temperature resistance: $TR_{10}$ was determined according to ASTM D1329

Fuel oil resistance: Percent volume change was determined by dipping into fuel oil C or methanol at 25° C. for 168 hours according to JIS K6258

Compression set: determined by subjecting P24 O-rings to conditions at 200° C. for 70 hours or 336 hours according to ASTM D395, Method B Corrosion test: a rubber test piece (30 mm×10 mm×2 mm) was inserted between two SPCC plates (cold-rolled steel plates specified by JIS G3141, 50 mm×20 mm×2 mm) and dipped into fuel mixture of fuel oil C/methanol in a ratio of 1:1 by volume, admixed with 2% by volume of an aggressive solution (solution mixture of water, hydrochloric acid and sodium sulfate) at 100° C. for 168 hours. Then, the rubber test piece was taken out of the fuel mixture and contact parts of the rubber test piece with the SPCC plates were visually inspected to find the presence of corrosion.

Fuel permeability test: about 40 ml of fuel oil C was put into a SUS 304 test cylinder (50 mm high, 50 mm in diameter and 5 mm in wall thickness) with the open top and the closed bottom. A rubber test piece (disc, 50 mm in diameter and 2 mm thick) was placed on the top to seal the open top and the periphery of the rubber test piece was sealed with a cylindrical frame in an inverted L-shaped cross-section to form a test jig. Then, the test jig was placed into a thermostat at 70° C. Weight of the entire test jig was measured at every 24 hours to determine a fuel permeation coefficient from changes in the weight.

Low-temperature sealing test: a test jig comprising an upper jig provided with a pressing means penetrated therethrough at the center and a space region below the pressing means, and a lower jig provided with P24 O-ring on the contact surface with the upper jig was used for the test. A fluorocarbon-based inert liquid (Fluorinate FC77(R), 3M product) was filled into the space region, and the test jig was left standing in a thermostat at −45° C. for one hour, and then pressure of 1 MPa was applied to the inert liquid by the pressing means to visually inspect the presence of inert liquid leakage from the contact surfaces (the contact surfaces being provided with no such space region) between the upper jig and the lower jig.

Fuel sealing test: in the above-mentioned low-temperature sealing test, methanol was filled into the space region of the test jig before the filling of the fluorocarbon-based inert liquid, and the test jig was left standing at 25° C. for 168 hours, followed by removal of methanol therefrom.

EXAMPLE 27

In Example 26, the same amount of the fluorine-containing elastomer obtained in Example 5 was used in place of that of Example 1.

EXAMPLE 28

In Example 26, the amount of MT carbon black was changed to 20 parts by weight, and 20 parts by weight of fine bituminous powder (Mineral Black 325BA, Keystone Filler product; average particle size: 6 μm) was further added thereto.

EXAMPLE 29

In Example 26, the amount of MT carbon black was changed to 20 parts by weight, and 20 parts by weight of flat graphite (average particle size: 10 μm; aspect ratio: 20) was further added thereto.

COMPARATIVE EXAMPLE 5

In Example 26, the same amount of commercially available fluorine-containing elastomer (GLT505, du Pont product) was used in place of the fluorine-containing elastomer of Example 1.

COMPARATIVE EXAMPLE 6

In Example 26, the same amount of commercially available fluorine-containing elastomer (GFLT501, du Pont product) was used in place of the fluorine-containing elastomer of Example 1.

COMPARATIVE EXAMPLE 7

In Example 26, the amount of calcium hydroxide was changed to one part by weight.

Test results of Examples 26 to 29 and Comparative Examples 5 to 7 are shown in the following Table 14, from which the curing products of Examples 26 to 29 have distinguished low-temperature characteristics and fuel oil resistance and are suitable for sealing materials for automobile fuel. It is also evident therefrom that addition of fine bituminous powder can improve the compression set characteristics, and addition of flat filler can improve the prevention of fuel oil leakage.

TABLE 14

| Determination items | | Example | | | | Comp. Ex. | | |
|---|---|---|---|---|---|---|---|---|
| | | 26 | 27 | 28 | 29 | 5 | 6 | 7 |
| [Normal state physical properties] | | | | | | | | |
| Hardness (Durometer A) | | 80 | 79 | 80 | 80 | 78 | 77 | 79 |
| Tensile strength | (MPa) | 13.4 | 12.9 | 11.8 | 12.5 | 15.5 | 14.9 | 13.3 |
| Elongation | (%) | 230 | 220 | 220 | 210 | 230 | 220 | 230 |
| [Low-temperature characteristics] | | | | | | | | |
| $TR_{10}$ | (° C.) | −33 | −35 | −33 | −33 | −30 | −24 | −33 |
| [Fuel oil resistance] | | | | | | | | |
| Fuel oil C | (%) | +7 | +8 | +7 | +7 | +5 | +5 | +6 |
| Methanol | (%) | +25 | +37 | +24 | +27 | +70 | +8 | +24 |
| [Compression set] | | | | | | | | |
| 70 hrs | (%) | 38 | 36 | 25 | 39 | 36 | 40 | 37 |
| 336 hrs | (%) | 83 | 79 | 59 | 85 | 82 | 87 | 84 |
| [Corrosion test] | | | | | | | | |
| Presence of corrosion | | none | none | none | none | none | none | found |
| [Fuel permeability test] | | | | | | | | |
| Fuel permeation coefficient (mg · mm/cm² · 24 hrs) | | 24 | 27 | 24 | 11 | 17 | 14 | 24 |

TABLE 14-continued

| | Example | | | | Comp. Ex. | | |
|---|---|---|---|---|---|---|---|
| Determination items | 26 | 27 | 28 | 29 | 5 | 6 | 7 |
| [Low-temperature sealing test] | | | | | | | |
| Presence of leakage | none | none | none | none | found | found | none |
| [Fuel sealing test] | | | | | | | |
| Presence of leaking | none | none | none | none | found | none | none |

What is claimed is:

1. A fluorine-containing elastomer having a copolymer composition, which comprises 50-85% by mole of (a) vinylidene fluoride, 0-25% by mole of (b) tetrafluoroethylene, 7-20% by mole of (c) perfluoro(methyl vinyl ether), 2.2-15% by mole of (d) $CF_2=CFO[CF_2CF(CF_3)O]_nCF_3$, where n is an integer of 4-6, and 0.1-2% by mole of (e) RfX, where Rf is an unsaturated fluorocarbon group having 2-8 carbon atoms, which may contain at least one ether group, and X is a bromine or iodine atom.

2. A fluorine-containing elastomer according to claim 1, wherein the elastomer has a solution viscosity η sp/c (1 wt. % methyl ethyl ketone solution at 35° C.) of 0.1-2 dl/g.

3. A fluorine-containing elastomer according to claim 1, wherein the elastomer has a solution viscosity η sp/c (1 wt. % methyl ethyl ketone solution at 35° C.) of 0.1-7 dl/g.

4. A fluorine-containing elastomer according to claim 1, wherein the elastomer is prepared by copolymerization in the presence of a bromo and/or iodo compound represented by the following general formula:

$$R(Br)_n(I)_m$$

Where R is a saturated fluorohydrocarbon group or a saturated chlorofluorohydrocarbon group, each having 2-6 carbon atoms, n and m each are 0, 1 or 2, and m+n is 2.

5. A fluorine-containing elastomer according to claim 4, wherein the bromo and/or iodo compound is $ICF_2CF_2CF_2CF_2I$.

6. A fluorine-containing elastomer according to claim 1, wherein a sum total of the component (c) and of the component (d) is at lest 10% by mole.

7. A fluorine-containing elastomer according to claim 1, wherein the component (e) is $CF_2=CFOCF_2CF_2Br$, $CF_2=CFBr$, $CF_2=CHBr$, $CF_2=CFI$ or $CF2=CHI$.

8. A fluorine-containing elastorner according to claim 1, wherein the elastomer has a glass transition temperature Tg of −30° C. to −45° C.

9. A fluorine-containing elastorner according to claim 1, wherein the elastomer can give a curing product having low-temperature characteristics according to ASTM D1329 after organic peroxide curing:

$$-43°\ C. \leq TR_{10} < -30°\ C. < TR_{70} \leq -20°\ C.$$

10. A fluorine-containing elastomer composition, which comprises 100 parts by weight of a fluorine-containing elastomer according to claim 1, 0.1-10 parts by weight of an organic peroxide, 0.1-10 parts by weight of a polyfunctional unsaturated compound and not less than 2 parts by weight of an acid acceptor.

11. A fluorine-containing elastomer composition according to claim 10, wherein not more than 40 parts by weight of fine bituminous powder is further contained.

12. A fluorine-containing elastomer composition according to claim 10, wherein not more than 40 parts by weight of a flat filler is further contained.

13. A fluororubber-based sealing material obtaining by curing molding of a fluorine-containing elastomer composition according to claim 10.

14. A fluororubber-based sealing material according to claim 13, for use as a sealing material for an automobile fuel system.

15. A fluororubber-based seal material according to claim 13, which has a $TR_{10}$ value of not more than −30° C. according to ASTM D1329 and a methanol swelling rate of not more than +50% at 25° C. for 168 hours according to JIS K6258.

16. A fluororubber-based sealing material according to claim 14, which has a $TR_{10}$ value of not more than −30° C. according to ASTM D1329 and a methanol swelling rate of not more than +50% at 25° C. for 168 hours according to JIS K6258.

17. A fluorine-containing elastomer according to claim 4, wherein a sum total of the component (c) and of the component (d) is at lest 10% by mole.

18. A fluorine-containing elastomer according to claim 4, wherein the component (e) is $CF_2=CFOCF_2CF_2Br$, $CF_2=CFBr$, $CF_2=CHBr$, $CF_2=CFI$ or $CF2=CHI$.

19. A fluorine-containing elastomer according to claim 4, wherein the elastomer has a glass transition temperature Tg of −30° C. to −45° C.

20. A fluorine-containing elastomer according to claim 4, wherein the elastomer can give a curing product having low-temperature characteristics according to ASTM D1329 after organic peroxide curing:

$$-43°\ C. \leq TR_{10} < -30°\ C. < TR_{70} \leq -20°\ C.$$

21. A fluororubber-based sealing material obtaining by curing molding of a fluorine-containing elastomer composition according to claim 11.

22. A fluororubber-based sealing material obtaining by curing molding of a fluorine-containing elastomer composition according to claim 12.

23. A fluororubber-based sealing material according to claim 21, for use as a sealing material for an automobile fuel system.

24. A fluororubber-based scaling material according to claim 22, for use as a sealing material for an automobile fuel system.

25. A fluororubber-based sealing material according to claim 21, which has a $TR_{10}$ value of not more than −30° C. according to ASTM D1329 and a methanol swelling rate of not more than +50% at 25° C. for 168 hours according to JIS K6258.

26. A fluororubber-based sealing material according to claim 22, which has a $TR_{10}$ value of not more than −30° C.

according to ASTM D 1329 and a methanol swelling rate of not more than +50% at 25° C. for 168 hours according to JIS K6258.

27. A fluororubber-based sealing material according to claim 23, which has a $TR_{10}$ value of not more than −30° C. according to ASTM D1329 and a methanol swelling rate of not mare than +50% at 25° C. for 168 hours according to JIS K6258.

28. A fluororubber-based sealing material according to claim 24, which has a $TR_{10}$ value of not more than −30° C. according to ASTM D329 and a methanol swelling rate of not more than +50% at 25° C. for 168 hours according to JIS K6258.

\* \* \* \* \*